(12) United States Patent
Chong et al.

(10) Patent No.: US 12,266,346 B2
(45) Date of Patent: Apr. 1, 2025

(54) NOISY FAR-FIELD SPEECH RECOGNITION

(71) Applicant: Zoom Communications, Inc., San Jose, CA (US)

(72) Inventors: Dading Chong, Hangzhou (CN); Zhaoyi Liu, Hangzhou (CN); Vijay Parthasarathy, San Jose, CA (US); Xiao Song, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 369 days.

(21) Appl. No.: 17/390,788

(22) Filed: Jul. 30, 2021

(65) Prior Publication Data

US 2023/0033768 A1 Feb. 2, 2023

(51) Int. Cl.
*G10L 15/00* (2013.01)
*G10L 15/02* (2006.01)
*G10L 15/06* (2013.01)
*G10L 25/84* (2013.01)

(52) U.S. Cl.
CPC ............ *G10L 15/063* (2013.01); *G10L 15/02* (2013.01); *G10L 25/84* (2013.01)

(58) Field of Classification Search
CPC ....... G10L 15/063; G10L 15/02; G10L 25/84; G10L 15/20; G10L 15/16; H04R 2225/41
See application file for complete search history.

(56) References Cited

U.S. PATENT DOCUMENTS

| | | | |
|---|---|---|---|
| 9,495,955 B1 * | 11/2016 | Weber | G10L 15/063 |
| 2019/0205748 A1 * | 7/2019 | Fukuda | G06N 3/044 |
| 2021/0224660 A1 * | 7/2021 | Song | G06N 3/045 |

FOREIGN PATENT DOCUMENTS

EP   1424685 A1 *   6/2004   ........... G10L 15/063

OTHER PUBLICATIONS

You Z, Su D, Yu D. Teach an all-rounder with experts in different domains. In ICASSP 2019-2019 IEEE International Conference on Acoustics, Speech and Signal Processing (ICASSP) May 12, 2019 (pp. 6425-6429). IEEE. (Year: 2019).*

(Continued)

*Primary Examiner* — Douglas Godbold
*Assistant Examiner* — Parker Mayfield
(74) *Attorney, Agent, or Firm* — Young Basile Hanlon & MacFarlane, P.C.

(57) ABSTRACT

The accuracy of automatic speech recognition (ASR) tasks is improved using trained models. A speech recognition model is applied in a noisy environment where speech is spoken at a distance from the microphones. The techniques may include extracting speech features, data augmentation by adding feature perturbation, and/or a multi-domain end-to-end speech recognition model. In some implementations, the described technology includes using a teacher-group knowledge distillation strategy to train a deep end-to-end speech recognition model on original speech samples and the sample speech augmentation of the original speech samples, that outputs recognized text transcriptions corresponding to speech detected in the original speech samples and the sample speech augmentation.

17 Claims, 9 Drawing Sheets

(56) References Cited

OTHER PUBLICATIONS

Fukuda T, Kurata G. Generalized knowledge distillation from an ensemble of specialized teachers leveraging unsupervised neural clustering. In ICASSP 2021-2021 IEEE International Conference on Acoustics, Speech and Signal Processing (ICASSP) Jun. 6, 2021 (pp. 6868-6872). IEEE. (Year: 2021).*
Rebai I, BenAyed Y, Mahdi W, Lorre JP. Improving speech recognition using data augmentation and acoustic model fusion. Procedia Computer Science. Jan. 1, 2017;112:316-22. (Year: 2017).*
Chen J, Wang Y, Wang D. Noise perturbation for supervised speech separation. Speech communication. Apr. 1, 2016;78:1-0. (Year: 2016).*
Lincoln M, McCowan I, Vepa J, Maganti HK. The multi-channel Wall Street Journal audio visual corpus (MC-WSJ-AV): Specification and initial experiments. In IEEE Workshop on Automatic Speech Recognition and Understanding, 2005. Nov. 27, 2005 (pp. 357-362). IEEE. (Year: 2005).*
Gao Y, Parcollet T, Lane N. Distilling Knowledge from Ensembles of Acoustic Models for Joint CTC-Attention End-to-End Speech Recognition. arXiv preprint arXiv:2005.09310. May 19, 2020. (Year: 2020).*
Jaitly N, Hinton GE. Vocal tract length perturbation (VTLP) improves speech recognition. InProc. ICML Workshop on Deep Learning for Audio, Speech and Language Jun. 16, 2013 (vol. 117, p. 21). (Year: 2013).*
Q. An, K. Bai, M. Zhang, Y. Yi and Y. Liu, "Deep Neural Network Based Speech Recognition Systems Under Noise Perturbations," 2020 21st International Symposium on Quality Electronic Design (ISQED), Santa Clara, CA, USA, 2020, pp. 377-382, doi: 10.1109/ISQED48828.2020.9136978. (Year: 2020).*
Semi-supervised end-to-end ASR via teacher-student learning with conditional posterior distribution, Zi-qiang Zhang et al., Interspeech 2020, Oct. 25-29, 20202, Shanghai, China, 5 pages.
Investigation of Data Augmentation Techniques for Disordered Speech Recognition, Mengzhe Geng et al., Interspeech 2020, Oct. 25-29, 2020, Shanghai, China, 5 pages.
Improving Noise Robustness of Automatic Speech Recognition Via Parallel Data and Teacher-Student Learning, Ladislav Mosner et al., Mar. 15, 2019, 5 pages.
Domain Adaptation Via Teacher-Student Learning for End-To-End Speech Recognition, Zhong Meng et al., Microsoft Corporation, Redmond, WA, USA, Jan. 6, 2020, 8 pages.
Audio Augmentation for Speech Recognition, Tom Ko et al., Johns Hopkins University, Baltimore, MD, 21218, USA, 4 pages, Year: 2015.
Improving speech recognition using data augmentation and acoustic model fusion, Ilyes Rebai et al., ScienceDirect, www.sciencedirect.com, Sep. 6-8, 2017, 7 pages.

* cited by examiner

NOISY FAR-FIELD SPEECH RECOGNITION

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for noisy far-field speech recognition.

One aspect of this disclosure is a method comprising training a student model using audio recordings from noise scenarios in a set of training data; training a first teacher model using a first subset of the set of training data associated with a first noise scenario; training a second teacher model using a second subset of the set of training data associated with a second noise scenario; and training the student model using soft labels output from the first teacher model and soft labels output from the second teacher model.

One aspect of this disclosure is a system comprising a network interface, a processor, and a memory, wherein the memory stores instructions executable by the processor to train a student model using audio recordings from noise scenarios in a set of training data; train a first teacher model using a first subset of the set of training data associated with a first noise scenario; train a second teacher model using a second subset of the set of training data associated with a second noise scenario; and train the student model using soft labels output from the first teacher model and soft labels output from the second teacher model.

One aspect of this disclosure is a method comprising decomposing a training signal from a set of training data into a message component and a noise component; scaling the noise component of the training signal by a random scale factor to obtain a scaled noise; adding the scaled noise to the message component to obtain a perturbed audio signal that is included in the set of training data; and training an audio model using the set of training data augmented with the perturbed audio signal.

One aspect of this disclosure is a system comprising a network interface, a processor, and a memory, wherein the memory stores instructions executable by the processor to decompose a training signal from a set of training data into a message component and a noise component; scale the noise component of the training signal by a random scale factor to obtain a scaled noise; adding the scaled noise to the message component to obtain a perturbed audio signal that is included in the set of training data; and train an audio model using the set of training data augmented with the perturbed audio signal.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
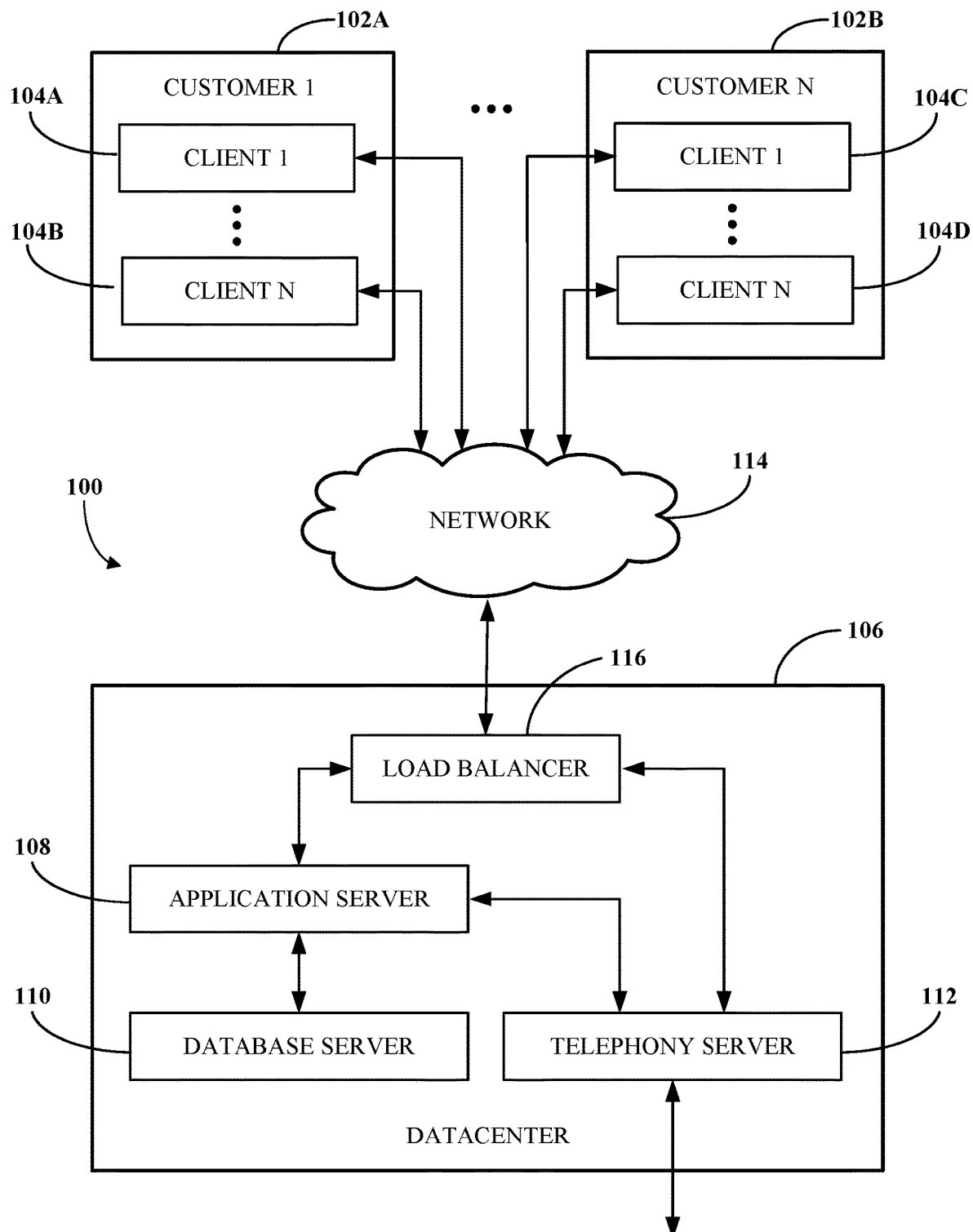
FIG. 1 is a block diagram of an example of an electronic computing and communications system.

The technology disclosed herein relates generally to the data augmentation for machine learning (e.g., deep neural network-based), end-to-end speech recognition models with a knowledge distillation training strategy to improve the relative performance for the end-to-end models under a noisy far-field environment. For example, the speech recognition models may be utilized for speech-to-text, full transcription, and automated speech recognition (ASR) (e.g., large-vocabulary continuous speech recognition (LVCSR)). In some implementations, these speech recognition models use a set of words referred to as tri-grams, etc. as their basic units. The resulting speech recognition models may be deployed in a UCaaS platform to convert audio signals (e.g., from phone calls or conferences) to text transcripts of speech.

The performance of ASR systems has received a significant increase of attention in science and industry, which caused or was caused by an equally significant improvement in recognition accuracy. Meanwhile, the massive increase of application demands also means that speech recognition is more frequently being performed in situations in which is speech spoken at a distance from the microphone in a noisy environment. These noisy far-field recording conditions are common for applications, such as voice-control of digital home assistants, the automatic transcription of online global conferences and education, human-to-robot communication, and several others more.

Recently, the large gains in speech recognition performance have been enabled by Deep Learning (DL). Besides, the performance of these speech recognition system based on DL relies greatly on the amount of data used during training. Although deep neural models have superior robustness over end-to-end speech recognition systems on different conditions such as speaker, recording channel and acoustic environment, noisy far-field ASR is still a challenging task for at least two reasons. First, it may be impractical to train a single model with good performance across all noise scenarios. Second, when encountering a new noise scenario task, the models trained with other noise scenario data are usually difficult to transfer knowledge to this new application environment.

Implementations of this disclosure address problems such as these by (1) applying different types of transformations to augment the speech data for training a speech recognition system, which can provide a large amount of transcribed training data; and/or (2) improving the multi-domain performance of an audio model (e.g., a speech recognition end-to-end model) by using a teacher-group knowledge distillation framework to train a robust end-to-end model.

In some implementations, feature extraction may be applied to audio signals that are input to a speech recognition end-to-end model (e.g., during training phase and during inference phase). In an example, the feature vectors extracted from a raw speech signal are 40-dimensional log-mel filterbank energy features appended with the first and second-order derivatives. Log-mel filterbank energy features may be computed with a 25 ms window and shifted every 10 ms. For example, the training input is eight consecutive frames that are stacking. In some embodiments, a global mean and variance normalization may be applied for each frame.

A limited set of training data may be augmented to provide more training example for a speech recognition end-to-end model and improve the robustness of the model. Feature perturbation aims at modifying the extracted acoustic feature vectors by adding random values. Given a speech signal s(n), this can be represented as a combination of the original message signal with the noise signal: s(n)=m(n)+e(n), where m(n) is the message signal and e(n) is the noise signal. Then, applying a feature extraction technique, the resulting transformation is:

$$f\_s = f\_m + f\_e,$$

where f_s is the features of the speech signal, f_m is the features of the message signal (e.g., a lower noise copy of the speech signal obtained with a microphone positioned closer to the speaker and/or through a filtering analysis), and f_e is the features of the noise signal.

Extracted features may be perturbed by scaling the noise features, which may be characteristic of a noise scenario (e.g., in a crowded café or on a street), by a random scale factor and adding them to the features of the message signal. In some implementations, extracted features for each utterance may be perturbed by multiplying the noise features f_e with random values $10^{(r/10)}$, where r is chosen from a range uniformly sampled in [−8 dB, −1 dB]. Thus, the added random values could be viewed as an explicit noise feature:

$$f\_p = f\_m + f\_e * 10^{(r/10)},$$

where f_p is the final features, which is also called perturbed features.

Figure 4:
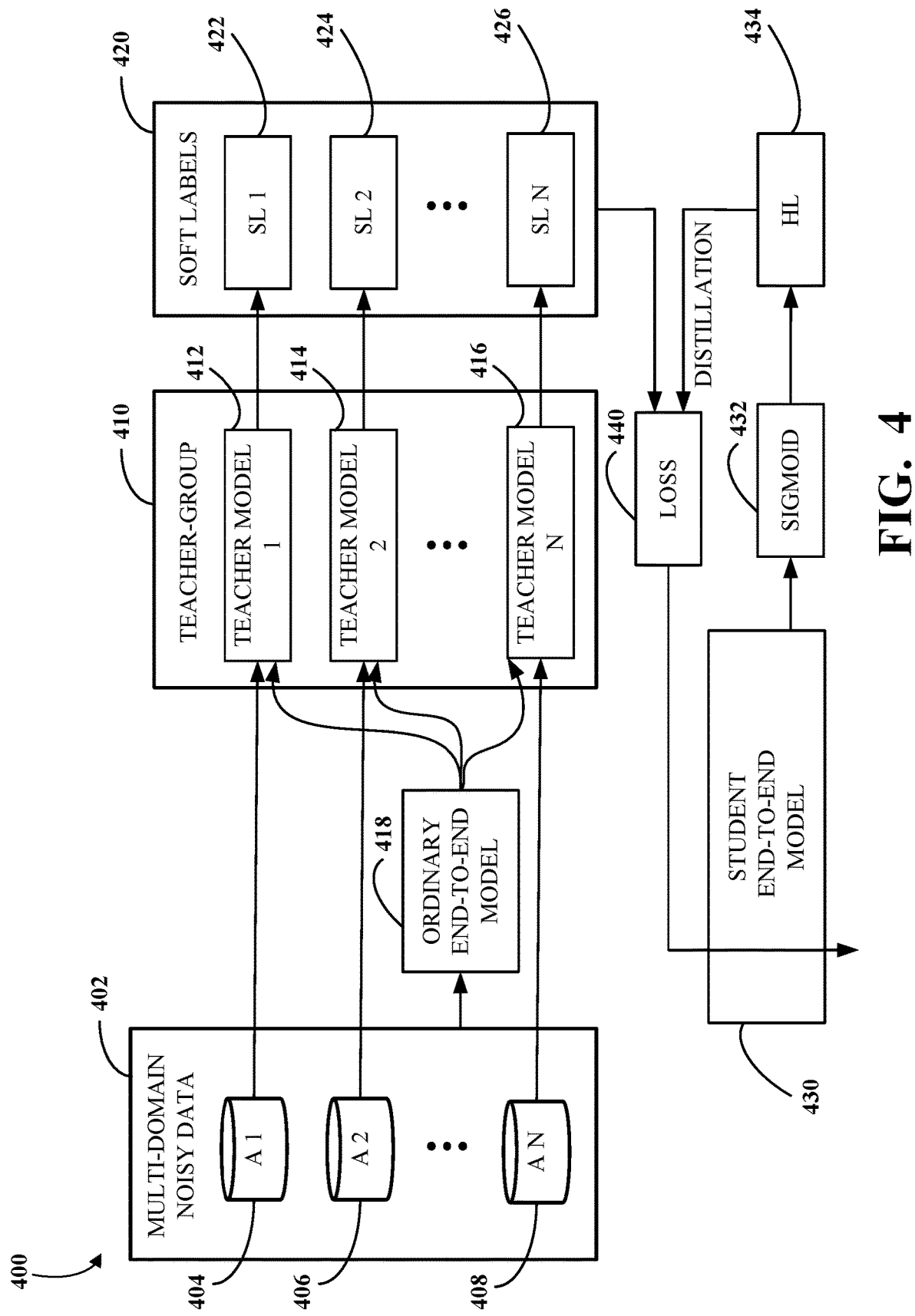
FIG. 4 is a block diagram of an example of a system utilizing a teacher-group knowledge distillation training process for an end-to-end speech recognition model.

Multi-domain teacher-group end-to-end training may be used to improve the robustness of an audio model (e.g., a speech recognition end-to-end model). A teacher-student training framework may be utilized. In some implementations, each teacher model is trained with noise scenario-specific data. A teacher model may obtain and transfer the most salient characteristics of each noise scenario. An example of a multi-domain teacher-student training framework is shown in FIG. 4. In an example, the process of training one student model from multiple teacher models may include three steps:

i. All training data is pooled from multiple applications or noise scenarios. Then, an ordinary model is trained with mini-batches of samples which are chosen randomly from the pooled set.

ii. Noisy domain-dependent teacher models are produced by fine-tuning the ordinary model with domain-dependent data, respectively. The n-th teacher model may be trained with noisy domain data from a subset of the pooled set associated with the n-th noise scenario.

iii. The student model learns from these N noise scenario teacher models. During the training process, samples in one minibatch are chosen randomly from the mixed data set and may come from different noise scenarios. The training process exploits each sample for training by using the soft targets produced from its corresponding domain-dependent teacher model as in equations below.

Let ptd(l|x) be the soft targets produced by noise scenario-specific data. δt(l) denotes the hard labels and w_hard is its weight. Thus, pt(l|x) can be view as a linear interpolation of hard labels and soft labels:

$$pt(l|x) = (1 - w\_hard) * ptd(l|x) + w\_hard * \delta t(l)$$

The fine-tuned student model may be tested in a testing phase. Feature extraction may be performed for the test signals. The test speech signals are pooled into the feature extractor. In some implementations, log-mel filterbank energy features are calculated. These features may be input to the acoustic model. For example, a system may use a final student Long Short-Term Memory (LSTM) acoustic models based on connectionist temporal classification (CTC) from training phase as the test acoustic model. In some implementations, an LSTM system may use 7 LSTM layers of 1024 cells, each with a recurrent projection layer of 512 units. The lookback order and lookahead order of each memory block may be 5 and 1, respectively, and the strides may be 2 and 1, respectively. For stable CTC learning, the gradients may be clipped to [−1.0, 1.0]. The 5-gram language model (LM) may be utilized to provide the prior probability of a word sequence, which is the final transcript-text.

To describe some implementations in greater detail, reference is first made to examples of hardware and software structures used to implement noisy far-field speech recognition. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
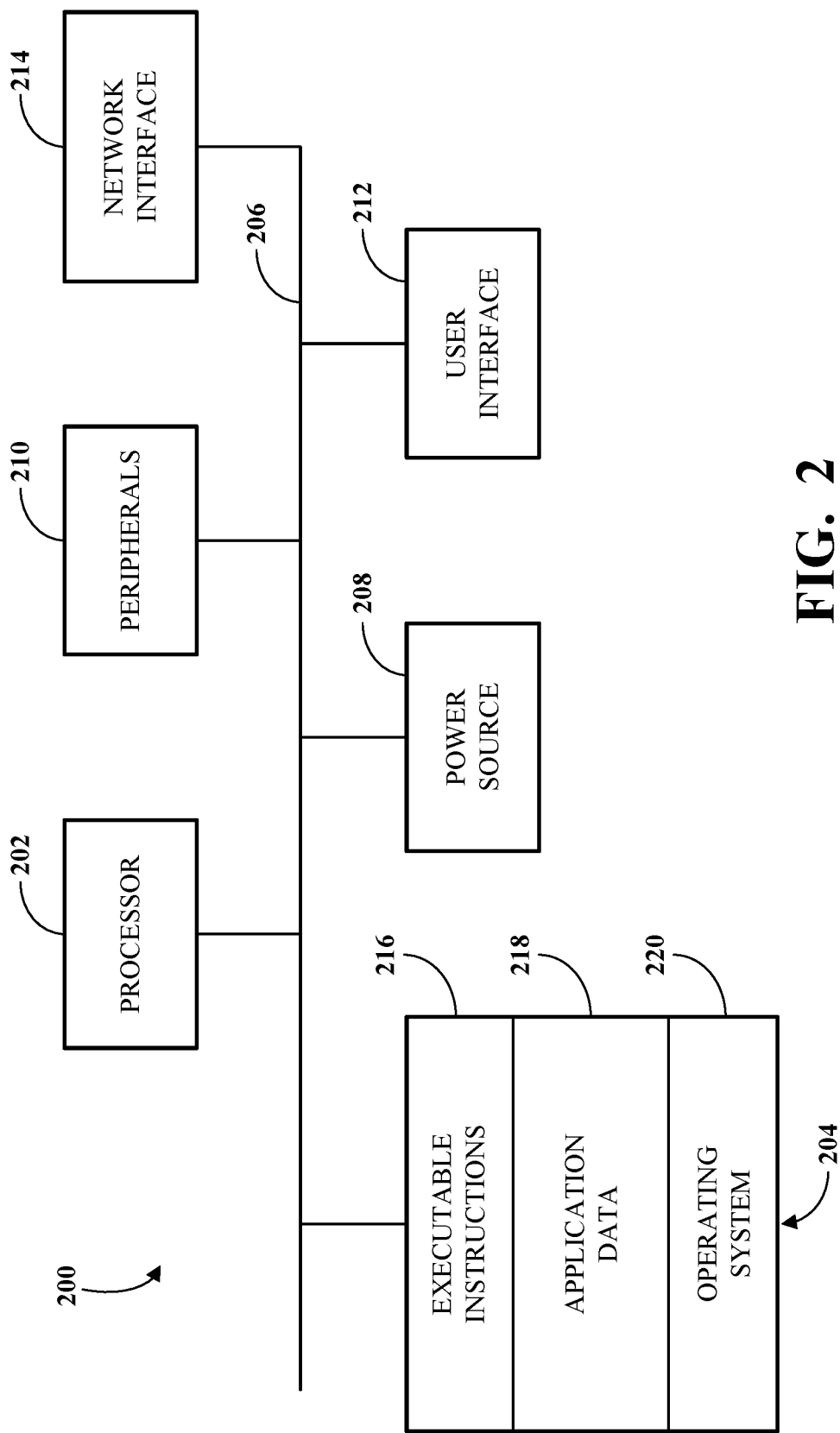
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
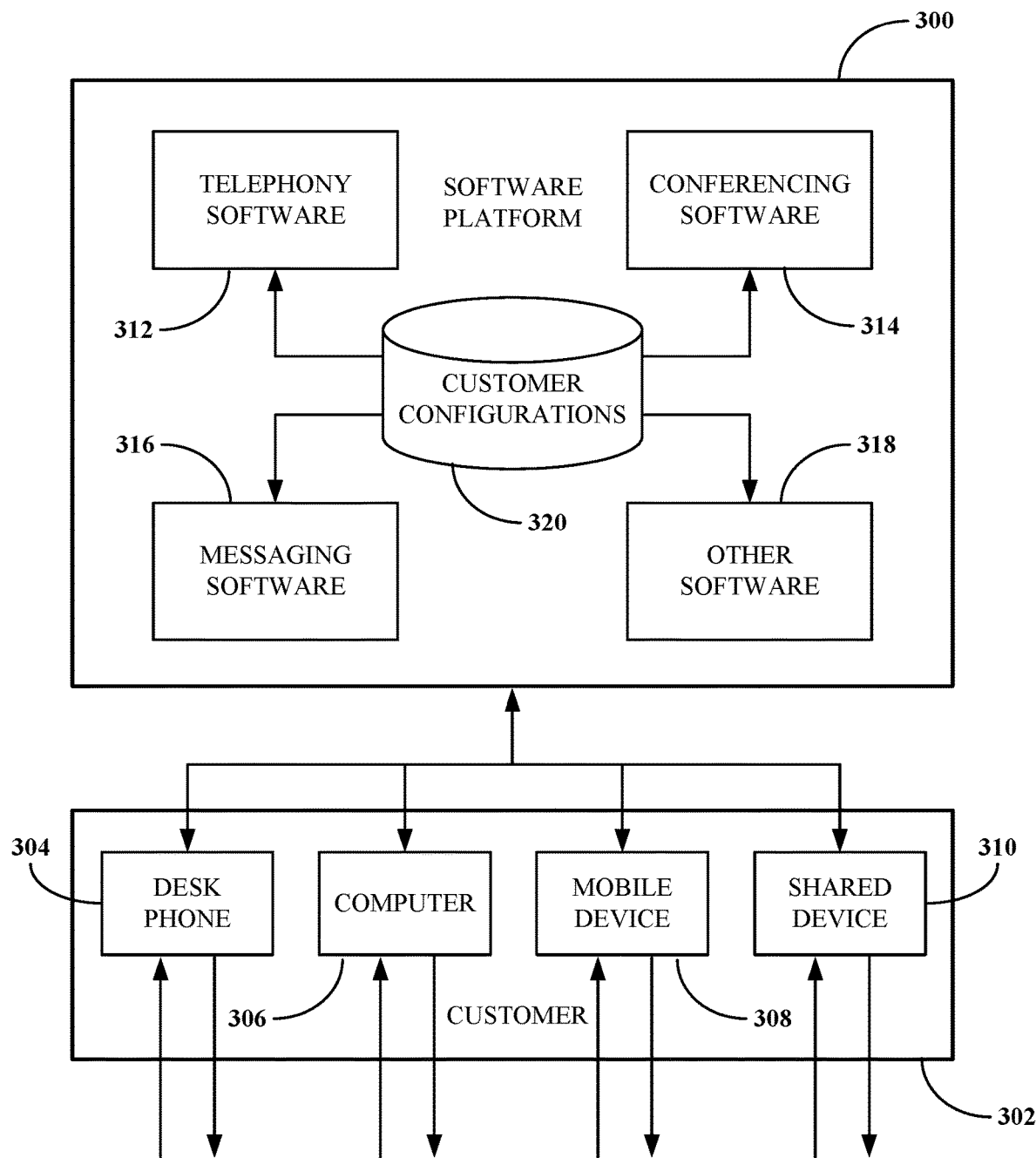
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIPenabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for applying a form noise perturbation to augment the speech data for training a speech recognition system, which can provide a large amount of transcribed training data, and/or improving the multi-domain performance of an audio model (e.g., a speech recognition end-to-end model) by using multiple teacher models trained for different noise scenarios in a teacher-group knowledge distillation framework to train a robust end-to-end model.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

FIG. 4 is a block diagram of an example of a system 400 utilizing a teacher-group knowledge distillation training process for and end-to-end speech recognition model. The system 400 includes a set of training data 402 that includes multi-domain noisy data. The set of training data 402 includes subsets (404, 406, and 408) that are each associated with a respective noise scenario characterizing the environment in which the training signal was recorded. The noise scenarios represented in the set of training data 402 may include, for example, noise in public transport (e.g., a bus a train or an airplane), a pedestrian area (e.g., a sidewalk or a park), a crowded indoor space (e.g., a café or restaurant), or a street junction. The set of training data 402 may also include labels reflecting the ground truth for speech captured in the training signals.

The system 400 includes an ordinary end-to-end model 418. The ordinary end-to-end model 418 may include a deep neural network that has trained with a wide assortment or all of the training data in the set of training data 402. For example, a back propagation algorithm may be used to train the ordinary end-to-end model 418. In some implementations, the ordinary end-to-end model 418 is trained with mini-batches of samples which are chosen randomly from the set of training examples 402.

The system 400 includes a teacher-group 410 that includes multiple teacher models (412, 414, and 416). The teacher models are each associated with a respective noise scenario. A teacher model is trained using training signals from the subset of the set of training data 402 that is associated with its noise scenario. The teacher model 412 is trained using training signals from the subset 404. The teacher model 414 is trained using training signals from the subset 406. The teacher model 416 is trained using training signals from the subset 408. In some implementations, the teacher models (412, 414, and 416) are produced by fine-tuning the ordinary end-to-end model 418 with domain-dependent data. For example, the state (e.g., weights) of the ordinary end-to-end model 418 may be copied to the teacher models (412, 414, and 416) before they start training with their respective subsets (404, 406, and 408) of the set of training data 402.

The system 400 includes soft labels 420 for training signals of the set of training data 402 that are output by the teacher model for the noise scenario associated with the training signal. A first subset 422 of the soft labels 420 corresponds to the subset 404 of the set of training data 402. The first subset 422 includes outputs of the teacher model 412 in response to corresponding training signals in the subset 404. A second subset 424 of the soft labels 420 corresponds to the subset 406 of the set of training data 402. The second subset 424 includes outputs of the teacher model 414 in response to corresponding training signals in the subset 406. An n-th subset 426 of the soft labels 420 corresponds to the subset 408 of the set of training data 402. The n-th subset 426 includes outputs of the teacher model 416 in response to corresponding training signals in the subset 408.

The system 400 includes a student model 430. In an example, the student model 430 may be trained using training signals randomly selected from the set of training data 402. In an example, the student model 430 may be trained using all the training signals in the set of training data 402 with their respective hard labels, which may reflect the ground truth for a training signal. For example, a back propagation algorithm may be used to train the student model 430. In some implementations, the student model 430 includes a deep neural network. For example, the student model 430 may include an LSTM acoustic model based on CTC from training phase as the test acoustic model. In an example embodiment, the student model 430 may use 7 LSTM layers of 1024 cells each with a recurrent projection layer of 512 units. For example, the lookback order and lookahead order of each memory block may be 5 and 1, respectively, and the strides may be 2 and 1, respectively. For stable CTC learning, the gradients may be clipped to [−1.0, 1.0]. In some implementations, the 5-gram LM may be utilized to provide the prior probability of a word sequence, which is the final transcript-text.

The system 400 includes a sigmoid function 432 applied to the output of the student model 430. The system 400 includes hard label injector 434 that inserts the corresponding hard label for a training signal in the feedback loop for training with the output of the student model 430 for the training signal.

The system 400 includes a loss function 440 that is configured to determine a loss signal based on an output of the student model 430 for a training signal, the hard label for the training signal, and a soft label for the training signal that has been output by the teacher model for the noise scenario associated with the training signal. In some implementations, the loss function determines a linear interpolation of the soft label and the hard label for the training signal. For example, a label used with a conventional loss function may be determined as:

$$pt(l|x)=(1-w\_hard)*ptd(l|x)+w\_hard*\delta t(l),$$

where $ptd(l|x)$ is the soft target produced by noise scenario-specific data using a teacher model, $\delta t(l)$ denotes a hard label, and $w\_hard$ is its weight. Thus, $pt(l|x)$ can be view as a linear interpolation of hard labels and soft labels. For example, the weight, $w\_hard$, may be set to a value between zero and one (e.g., 0.25, 0.5, or 0.75). In some implementations, during the training process, training signals in one minibatch are chosen randomly from the set of training data 402 and may come from different noise scenarios.

Figure 5:
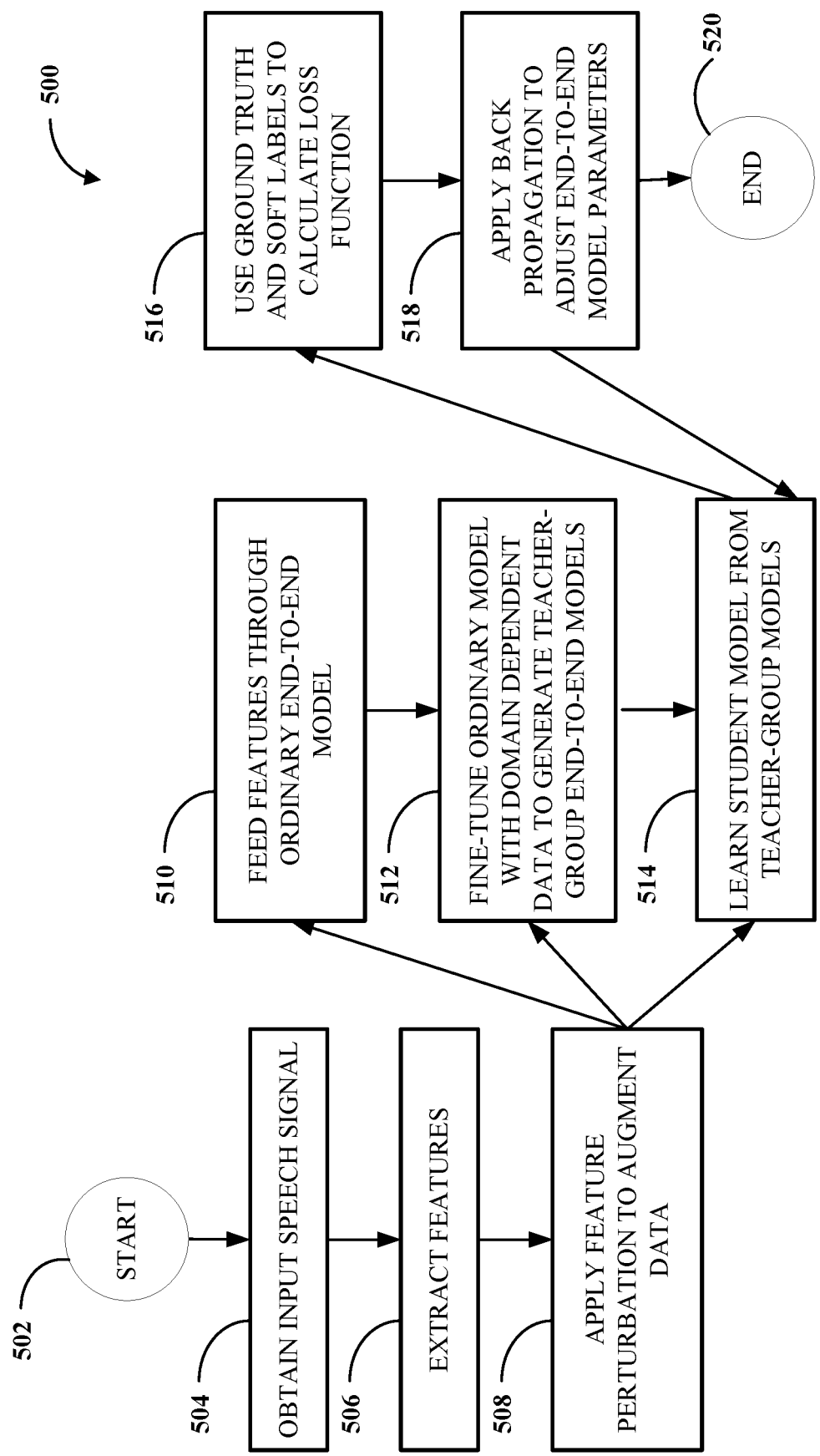
FIG. 5 is a flowchart of an example of a technique for using data augmentation and teacher-group knowledge distillation for training a deep neural network-based end-to-end speech recognition model.

To further describe some implementations in greater detail, reference is next made to examples of techniques which may be performed to implement noisy far-field speech recognition. FIG. 5 is a flowchart of an example of a technique 500 for using data augmentation and teacher-group knowledge distillation for training a deep neural network-based end-to-end speech recognition model. The technique 500 can be executed using computing devices, such as the systems, hardware, and software described with respect to FIGS. 1-4. The technique 500 can be performed, for example, by executing a machine-readable program or other computer-executable instructions, such as routines, instructions, programs, or other code. The steps, or operations, of the technique 500 or another technique, method, process, or algorithm described in connection with the implementations disclosed herein can be implemented directly in hardware, firmware, software executed by hardware, circuitry, or a combination thereof.

For simplicity of explanation, the technique 500 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 502, the technique 500 includes starting a training phase for a speech recognition end-to-end model with a set of training data (e.g., the set of training data 402). The training phase begins by first performing data augmentation on the set of training data to increase the number of useful training signals in the set of training data.

At 504, the technique 500 includes obtaining an input speech signal from the set of training data. This speech signal may have been recorded with a microphone that was positioned far from a source of the speech signal (e.g., a speaker) in a noisy environment of a particular type and be associated with a noise scenario (e.g., a café or a street). In some implementations, the speech signal is associated with metadata, which may include a hard label reflecting the ground truth of speech captured in the signal. In some implementations, the metadata also includes message signal corresponding to the speech signal. For example, the message signal may be a recording the same speech that was record with a microphone positioned closer to the source of the speech resulting in a substantially higher signal-to-noise ratio.

At 506, the technique 500 includes extracting features from the speech signal. This may serve to transform the speech signal into a feature domain and format it in way that the speech recognition end-to-end model is configured to take as input.

At 508, the technique 500 includes applying feature perturbation to the speech signal to augment the training data with more training signals. The speech signal may be decomposed into a message component and a noise component, and the noise component may be scaled by a random scale factor before it is added back to the message component to obtain a perturbed speech signal.

At 510, the technique 500 includes feeding features of speech signals in the augmented set of training data through an ordinary end-to-end model to train it. At 512, the ordinary end-to-end model is copied and fine-tuned with domain dependent data from the set of training data to generate teacher-group end-to-end models. Each teacher-group end-to-end model may be associated with a particular noise scenario and trained using speech signals from the set of training data that are associated with that noise scenario.

At 514, the technique 500 includes a student model (e.g., the student model 430) learning from the teacher-group models. At 516, the technique 500 includes using ground truth (e.g., hard labels) and soft labels to calculate a loss function for training the student model. The soft label may be determined as an output of the teacher-group end-to-end model for the associated noise scenario in response to the speech signal being used to train. For example, the loss function may determine a label for a speech signals in the set of training data that as a linear interpolation of a hard label and the soft label. At 518, the technique 500 includes applying back propagation using the loss function to adjust the model parameters of the student model. At 520, the training phase ends and the student model is ready to be used in inference phase as a speech recognition end-to-end model.

Figure 6:
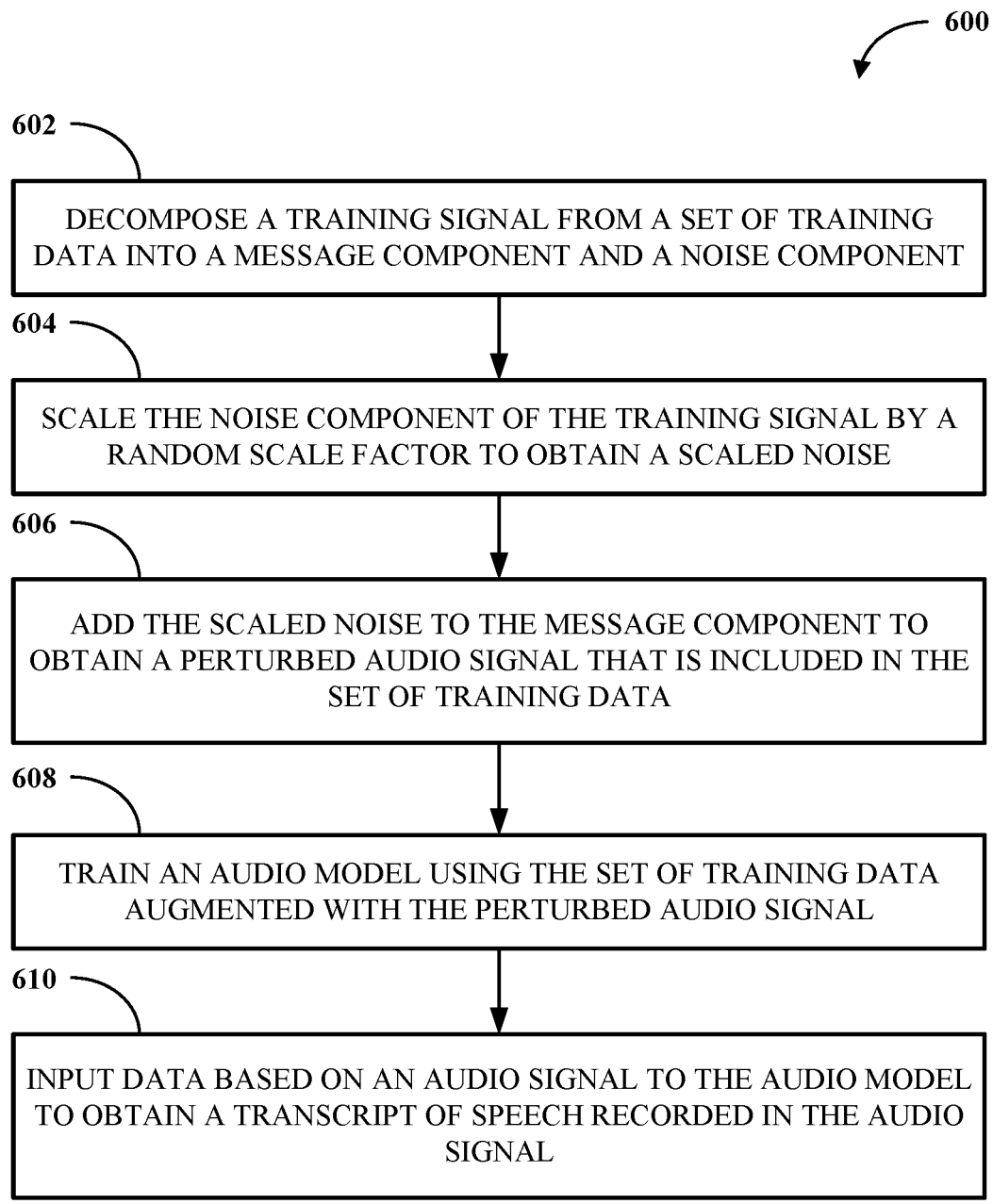
FIG. 6 is a flowchart of an example of a technique for data augmentation for a set of training data for a speech recognition model.

FIG. 6 is a flowchart of an example of a technique 600 for data augmentation for a set of training data for a speech recognition model. The technique 600 can be executed using computing devices, such as the systems, hardware, and software described with respect to FIGS. 1-4. The technique 600 can be performed, for example, by executing a machine-readable program or other computer-executable instructions, such as routines, instructions, programs, or other code. The steps, or operations, of the technique 600 or another technique, method, process, or algorithm described in connection with the implementations disclosed herein can be implemented directly in hardware, firmware, software executed by hardware, circuitry, or a combination thereof.

For simplicity of explanation, the technique 600 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 602, the technique 600 includes decomposing a training signal from a set of training data (e.g., the set of training data 402) into a message component and a noise component. The message component may be a low-noise recording of a desired speech signal in the training signal. For example, the message component may be an audio signal recorded with microphone near a desired audio source (e.g., a speaker) while the training signal is recorded with a microphone far from the desired audio source. In some examples, the message component is separated from the training signal using audio filtering techniques. The noise component may be determined by subtracting the message component from the training signal. For example, the noise component may be characteristic of a noise scenario (e.g., a crowded café or a street corner) associated with the training signal. In some implementations, decomposition of the training signal is performed on raw audio signals (e.g., pulse code modulated audio signals). In some implementations, decomposition of the training signal is performed in a feature domain after the training signal and the message component have been transformed to respective sets of features by applying a feature extraction technique (e.g., including application of a log-mel filterbank). For example, the technique 700 of FIG. 7 may be implemented to decompose a training signal into a message component and a noise component.

At 604, the technique 600 includes scaling the noise component of the training signal by a random scale factor to obtain a scaled noise. In some implementations, the random scale factor is a power with a base that is a constant and an exponent that includes a random variable. For example, the random scale factor may be of the form $10^{(r/10)}$, where r is chosen from a range uniformly sampled in [−8 dB, −1 dB]. The scaling of the noise component may be performed on a raw audio version of the noise component or on a feature domain representation of the noise component. For example, the scaled noise maybe determined as $f\_e * 10^{(r/10)}$ in a feature domain, where f_e is the features of the noise component.

At 606, the technique 600 includes adding the scaled noise to the message component to obtain a perturbed audio signal that is included in the set of training data. The scaled noise may be added as raw audio or in a feature domain. For example, a feature domain representation of a perturbed audio signal may be determined as $f\_p = f\_m + f\_e * 10^{(r/10)}$, where f_p is the features of the perturbed audio signal.

At 608, the technique 600 includes training an audio model (e.g., the student model 430) using the set of training data augmented with the perturbed audio signal. For example, features of a perturbed audio signal (e.g., f_p) may be input to the model being trained.

At 610, after the audio model (e.g., a speech recognition end-to-end model) has been trained, the audio model may be used during an inference phase to perform ASR tasks. In this example, the technique 600 includes inputting data based on an audio signal to the audio model to obtain a transcript of speech recorded in the audio signal.

Figure 7:
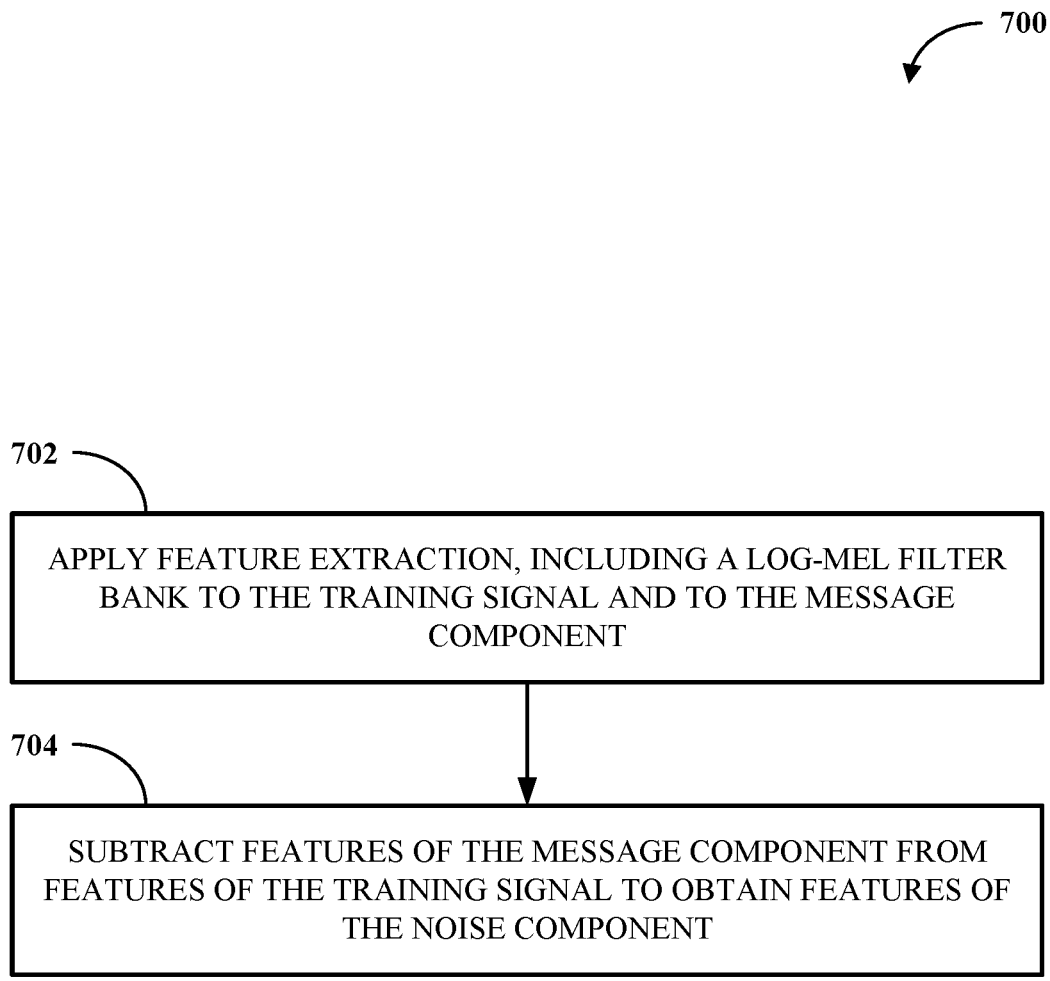
FIG. 7 is a flowchart of an example of a technique for decomposing a training signal into a message component and a noise component.

FIG. 7 is a flowchart of an example of a technique 700 for decomposing a training signal into a message component and a noise component. The technique 700 can be executed using computing devices, such as the systems, hardware, and software described with respect to FIGS. 1-4. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, the technique 700 includes applying feature extraction, including a log-mel filter bank, to the training signal and to the message component. In some implementations, the feature vectors extracted from the training signal are 40-dimensional log-mel filterbank energy features appended with the first and second-order derivatives. For example, log-mel filterbank energy features may be computed with a 25 ms window and shifted every 10 ms. In some embodiments, the training input is eight consecutive frames that are stacking. In some examples, a global mean and variance normalization may be applied for each frame.

At 704, the technique 700 includes subtracting features of the message component from features of the training signal to obtain features of the noise component. For example, the features of the noise component may be determined as:

$$f\_e = f\_s - f\_m$$

where f_s is the features of the speech signal, f_m is the features of the message signal (e.g., a lower noise copy of the speech signal obtained with a microphone positioned closer to the speaker and/or through a filtering analysis), and f_e is the features of the noise signal.

Figure 8:
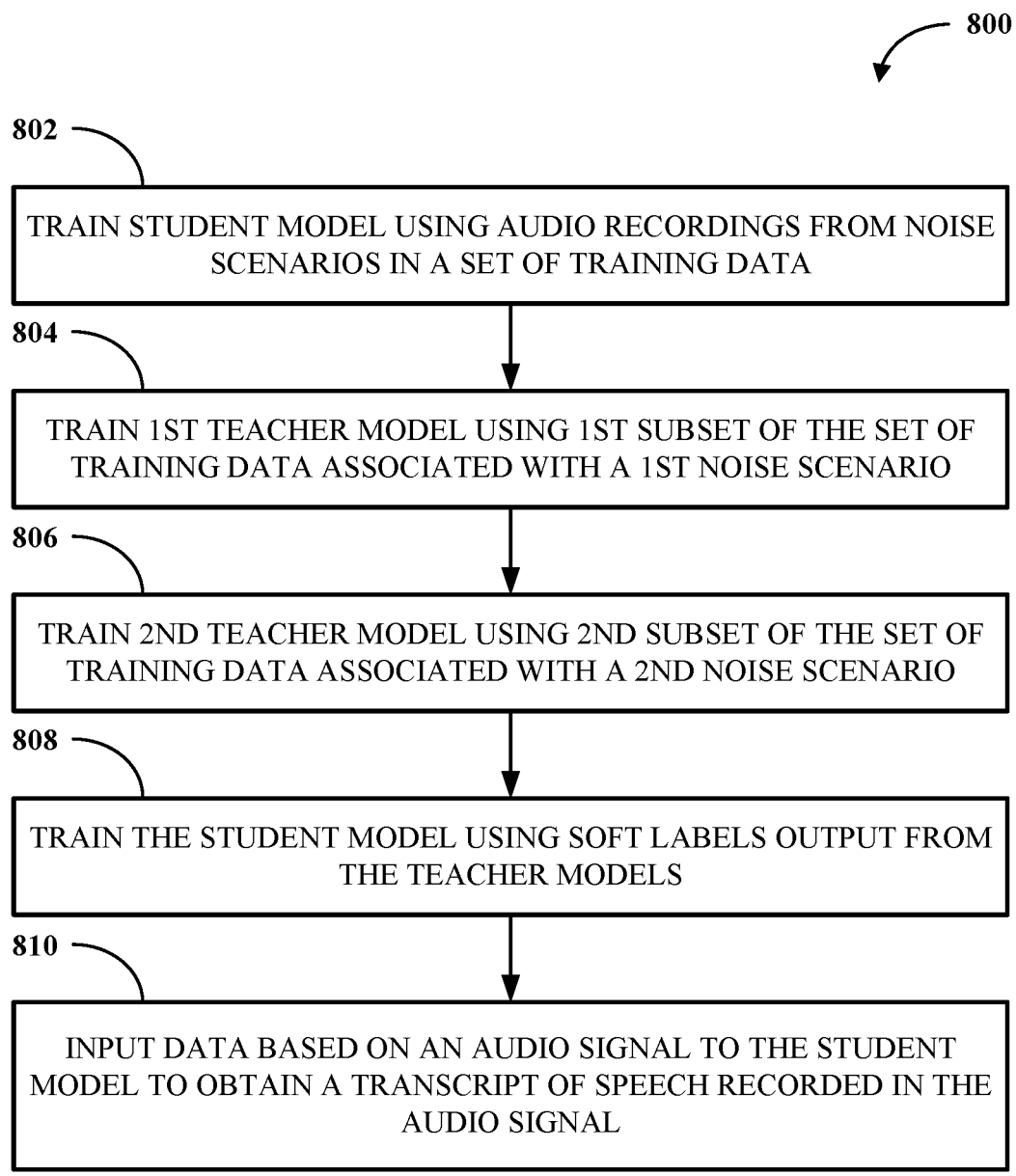
FIG. 8 is a flowchart of an example of a technique for training a speech recognition model using a set of training data that includes examples recorded in multiple noise scenarios using multiple respective teacher models for the noise scenarios.

FIG. 8 is a flowchart of an example of a technique 800 for training a speech recognition model using a set of training data that includes examples recorded in multiple noise scenarios using multiple respective teacher models for the noise scenarios. The technique 800 can be executed using computing devices, such as the systems, hardware, and software described with respect to FIGS. 1-4. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, the technique 800 includes training a student model (e.g., the student model 430) using audio recordings from noise scenarios (e.g., a bus, a train, an airplane, a restaurant, a street, and/or a beach) in a set of training data (e.g., the set of training data 402). In some implementations, the set of training data is augmented by perturbation with scaled noise signals. For example, the technique 600 of FIG. 6 may have been used to augment the set of training data. In an example, the student model may be trained using training signals randomly selected from the set of training data. In an example, the student model may be trained using all the training signals in the set of training data with their respective hard labels, which may reflect the ground truth for a training signal. For example, a back propagation algorithm may be used to train the student model. In some implementations, the student model includes a deep neural network. For example, the student model may include an LSTM acoustic model based on CTC from training phase as the test acoustic model. In an example embodiment, the student model may use 7 LSTM layers of 1024 cells each with a recurrent projection layer of 512 units. For example, the lookback order and lookahead order of each memory block may be 5 and 1, respectively, and the strides may be 2 and 1, respectively. For stable CTC learning, the gradients may be clipped to [−1.0, 1.0]. In some implementations, the 5-gram LM may be utilized to provide the prior probability of a word sequence, which is the final transcript-text.

At 804, the technique 800 includes training a first teacher model (e.g., the teacher model 412) using a first subset of the set of training data associated with a first noise scenario. For example, a back propagation algorithm may be used to train the first teacher model. In some implementations, the first teacher model has a structure similar to the student model.

At 806, the technique 800 includes training a second teacher model (e.g., the teacher model 414) using a second subset of the set of training data associated with a second noise scenario. For example, a back propagation algorithm may be used to train the second teacher model. In some implementations, the second teacher model has a structure similar to the student model. For example, the subset of the training data associated with the first noise scenario may be based on audio recordings from streets, and the subset of the training data associated with the first noise scenario may be based on audio recordings from rooms inside buildings.

At 808, the technique 800 includes training the student model using soft labels output from the first teacher model and soft labels output from the second teacher model. In some implementations, training the student model includes determining a label for a training signal as a linear interpolation of a soft label from the second teacher model and a hard label for the training signal. For example, the label may be determined as:

$$pt(l|x)=(1-w\_hard)*ptd(l|x)+w\_hard*\delta t(l),$$

where ptd(l|x) is the soft target produced by noise scenario-specific data using a teacher model, $\delta t(1)$ denotes a hard label, and w_hard is its weight. Thus, pt(l|x) can be view as a linear interpolation of hard labels and soft labels. For example, the weight, w_hard, may be set to a value between zero and one (e.g., 0.25, 0.5, or 0.75). For example, the technique 900 of FIG. 9 may be implemented to train the student model using soft labels output from the teacher models. For example, a back propagation algorithm may be used with the interpolated labels to train the student model.

At 810, after the student model (e.g., a speech recognition end-to-end model) has been trained, the student model may be used during an inference phase to perform ASR tasks. In this example, the technique 800 includes inputting data based on an audio signal to the student model to obtain a transcript of speech recorded in the audio signal.

In some implementations (not shown explicitly in FIG. 8), more than two teacher models may be trained using training data associated with respective noise scenarios. These additional teacher models may also be used to provide soft labels for training signals of their respective noise scenarios to the student model for its training.

Figure 9:
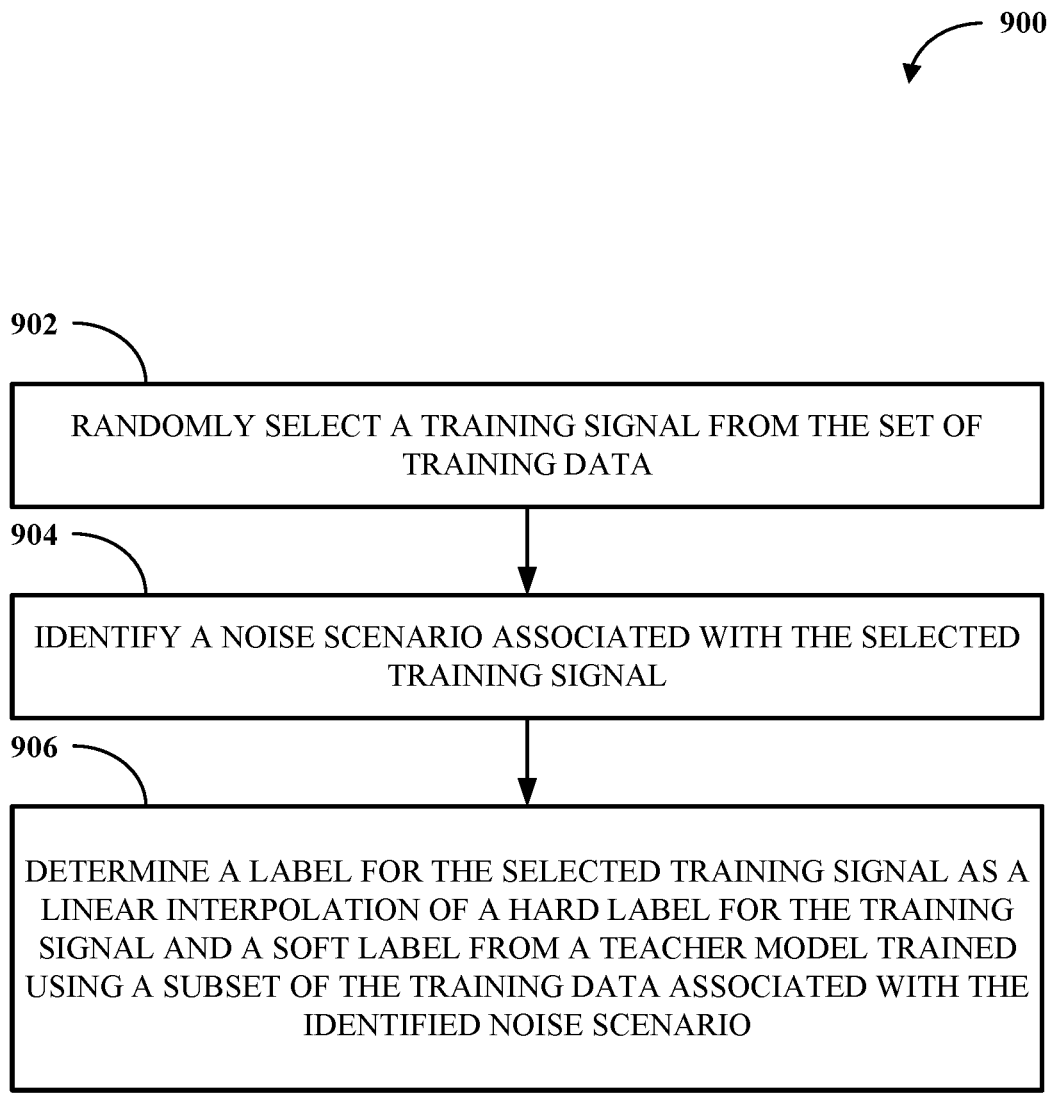
FIG. 9 is a flowchart of an example of a technique for training of a student model using soft labels output from multiple teacher models.

FIG. 9 is a flowchart of an example of a technique 900 for training of a student model using soft labels output from multiple teacher models. The technique 900 can be executed using computing devices, such as the systems, hardware, and software described with respect to FIGS. 1-4. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, the technique 900 includes randomly selecting a training signal from the set of training data (e.g., the set of training data 402).

At 904, the technique 900 includes identifying a noise scenario associated with the selected training signal. For example, the selected training signal may be stored as part of data structure (e.g., a file or a database record) that includes an indication of a noise scenario (e.g., public transport, a pedestrian area, a café, or a street junction) associated with the training signal. The training signal may be part of a subset of the set of training data that is associated with the identified noise scenario. This subset of the training data may have been used to train a teacher model (e.g., the teacher model 412) that specializes in the identified noise scenario.

At 906, the technique 900 includes determining a label for the selected training signal as a linear interpolation of a hard label for the training signal and a soft label from a teacher model trained using a subset of the training data associated with the identified noise scenario. The training process may exploit samples associated with particular noise scenarios for training by using the soft targets produced from its corresponding domain-dependent teacher model. For example, the label may be determined as:

$$pt(l|x)=(1-w\_hard)*ptd(l|x)+w\_hard*\delta t(l),$$

where ptd(l|x) is the soft target produced by noise scenario-specific data using a teacher model, δt(l) denotes a hard label, and w_hard is its weight. Thus, pt(l|x) can be view as a linear interpolation of hard labels and soft labels. For example, the weight, w_hard, may be set to a value between zero and one (e.g., 0.25, 0.5, or 0.75).

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
    training a model using audio recordings from noise scenarios in a set of training data;
    decomposing a training signal from the set of training data into a message component and a noise component;
    scaling the noise component by a random scale factor to obtain a scaled noise, wherein the random scale factor is a power with a base that is a constant and an exponent that includes a random variable;
    adding the scaled noise to the message component to obtain a perturbed audio signal that is included in the set of training data;
    training a first teacher model using a first subset of the set of training data associated with a first noise scenario of the noise scenarios;
    training a second teacher model using a second subset of the set of training data associated with a second noise scenario of the noise scenarios; and
    training a student model using soft labels output from the first teacher model and soft labels output from the second teacher model.

2. The method of claim 1, wherein training the student model using soft labels output from the second teacher model comprises:
    determining a label for a training signal from the set of training data as a linear interpolation of a soft label from the second teacher model and a hard label for the training signal.

3. The method of claim 1, wherein training the student model using soft labels output from the second teacher model comprises:
    randomly selecting a training signal from the set of training data;
    identifying a noise scenario associated with the selected training signal; and
    determining a label for the selected training signal as a linear interpolation of a hard label for the training signal and a soft label from a teacher model trained using a subset of the training data associated with the identified noise scenario.

4. The method of claim 1, wherein the first subset of the training data associated with the first noise scenario is based on audio recordings from streets, and the second subset of the training data associated with the second noise scenario is based on audio recordings from rooms inside buildings.

5. The method of claim 1,
    wherein the random scale factor is chosen from a range uniformly sampled in [−8 dB, −1 dB).

6. The method of claim 1, wherein the message component is an audio signal recorded with a microphone near a desired audio source while the training signal is recorded with a microphone far from the desired audio source.

7. The method of claim 1, wherein decomposing the training signal from the set of training data into the message component and the noise component comprises:
applying feature extraction, including a log-mel filter bank, to the training signal and to the message component; and
subtracting features of the message component from features of the training signal to obtain features of the noise component.

8. A system comprising:
a network interface,
a processor, and
a memory, wherein the memory stores instructions executable by the processor to:
train a model using audio recordings from noise scenarios in a set of training data;
decompose a training signal from the set of training data into a message component and a noise component;
scale the noise component by a random scale factor to obtain a scaled noise, wherein the random scale factor is a power with a base that is a constant and an exponent that includes a random variable;
add the scaled noise to the message component to obtain a perturbed audio signal that is included in the set of training data;
train a first teacher model using a first subset of the set of training data associated with a first noise scenario of the noise scenarios;
train a second teacher model using a second subset of the set of training data associated with a second noise scenario of the noise scenarios; and
train a student model using soft labels output from the first teacher model and soft labels output from the second teacher model.

9. The system of claim 8, wherein the memory stores instructions executable by the processor to:
determine a label for a training signal from the set of training data as a linear interpolation of a soft label from the second teacher model and a hard label for the training signal.

10. The system of claim 8, wherein the memory stores instructions executable by the processor to:
randomly select a training signal from the set of training data;
identify a noise scenario associated with the selected training signal; and
determine a label for the selected training signal as a linear interpolation of a hard label for the training signal and a soft label from a teacher model trained using a subset of the training data associated with the identified noise scenario.

11. The system of claim 8, wherein the memory stores instructions executable by the processor to:
input data based on an audio signal to the student model to obtain a transcript of speech recorded in the audio signal.

12. The system of claim 8, wherein the a random scale factor is chosen from a range uniformly sampled in [−8 dB, −1 dB).

13. The system of claim 8, wherein the message component is an audio signal recorded with a microphone near a desired audio source while the training signal is recorded with a microphone far from the desired audio source.

14. The system of claim 8, wherein the memory stores instructions executable by the processor to:
apply feature extraction, including a log-mel filter bank, to the training signal and to the message component; and
subtract features of the message component from features of the training signal to obtain features of the noise component.

15. A non-transitory computer-readable storage medium, comprising executable instructions that, when executed by a processor, facilitate performance of operations, comprising:
training a model using audio recordings from noise scenarios in a set of training data;
decomposing a training signal from the set of training data into a message component and a noise component;
scaling the noise component by a random scale factor to obtain a scaled noise, wherein the random scale factor is a power with a base that is a constant and an exponent that includes a random variable;
adding the scaled noise to the message component to obtain a perturbed audio signal that is included in the set of training data;
training a first teacher model using a first subset of the set of training data associated with a first noise scenario of the noise scenarios;
training a second teacher model using a second subset of the set of training data associated with a second noise scenario of the noise scenarios; and
training a student model using soft labels output from the first teacher model and soft labels output from the second teacher model.

16. The non-transitory computer-readable storage medium of claim 15, wherein training the student model using soft labels output from the second teacher model comprises:
determining a label for a training signal from the set of training data as a linear interpolation of a soft label from the second teacher model and a hard label for the training signal.

17. The non-transitory computer-readable storage medium of claim 15, wherein the random scale factor is chosen from a range uniformly sampled in [−8 dB, −1 dB).

* * * * *